United States Patent
Huertgen et al.

(10) Patent No.: US 6,535,814 B2
(45) Date of Patent: Mar. 18, 2003

(54) NAVIGATION SYSTEM WITH ROUTE DESIGNATING DEVICE

(75) Inventors: Bernd Huertgen, Sibbesse (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/804,439

(22) Filed: Mar. 12, 2001

(65) Prior Publication Data

US 2001/0029428 A1 Oct. 11, 2001

(30) Foreign Application Priority Data

Mar. 15, 2000 (DE) .......................................... 100 12 471

(51) Int. Cl.[7] .............................................. G01C 21/00
(52) U.S. Cl. ........................ 701/210; 701/223; 348/118
(58) Field of Search ................... 701/209, 210, 701/223, 213, 216; 348/113, 116, 118, 119; 340/995; 342/70, 357.13, 357.14

(56) References Cited

U.S. PATENT DOCUMENTS

| 5,130,709 A | * | 7/1992 | Toyama et al. | 340/990 |
| 5,144,685 A | * | 9/1992 | Nasar et al. | 348/119 |
| 5,844,505 A | * | 12/1998 | Van Ryzin | 340/905 |
| 6,018,697 A | * | 1/2000 | Morimoto et al. | 340/988 |
| 6,032,098 A | * | 2/2000 | Takahashi et al. | 701/210 |
| 6,285,393 B1 | * | 9/2001 | Shimoura et al. | 348/119 |

FOREIGN PATENT DOCUMENTS

JP 2000-76593 * 3/2000

* cited by examiner

Primary Examiner—Michael J. Zanelli
(74) Attorney, Agent, or Firm—Michael J. Striker

(57) ABSTRACT

A navigation system has a map storage containing map informations, a route suggesting device which with consideration of the map information from such map storage provides route suggestions, and a device which produces an image of an environment of a navigation system, so that the route suggesting device also considers the image of the environment of the navigation system produced by the image producing device.

7 Claims, 1 Drawing Sheet

NAVIGATION SYSTEM WITH ROUTE DESIGNATING DEVICE

BACKGROUND OF THE INVENTION

The present relates to a navigation system with a route designating device.

Navigation systems are known, in which position informations and movement informations are supplied to a route designation device. Furthermore, the route designation device utilizes map informations which are available from a map storage. Problems arise when in particular in the cases of long covered distances, the position informations are no longer precise, so that the deviations of the determined position from the actual position occur. Position systems for this purpose use additional informations. For example by a comparison of the map information with the position information, a correction of the position information is provided.

SUMMARY OF THE INVENTION

Accordingly, it is an object of present invention to provide a navigation system of the above mentioned general type, which is a further improvement of the existing systems.

In keeping with these objects and with others which will become apparent hereinafter, one feature of present invention resides, briefly stated, in a navigation system in which an image producing device is provided, which produces an image of an environment of the navigation system, and the route suggestion device takes in the consideration the image of the image producing device.

When the navigation system is designed in accordance with the present invention, then due to the evaluation of the additional information, an improvement of the navigation or the route suggestion is possible. For this purpose the image information of the environment, for example optical information is provided for the navigation system.

In accordance with a further feature of the present invention, simple utilization of the information is provided, in that distinctive objects in the environment of the navigation system are recognized. Also, the relative position of the navigation system or the position of the navigation system relative to the distinctive object can be utilized. The thusly recognized objects can be compared with the map information, so that the identification of the distinctive object is facilitated.

In addition, naturally also position informations can be considered, which in some cases are corrected by the image informations. Furthermore, the image informations can be joined with the information of the movement sensors. For image generation, preferably a video camera and/or an infrared camera and/or a radar antenna can be utilized.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
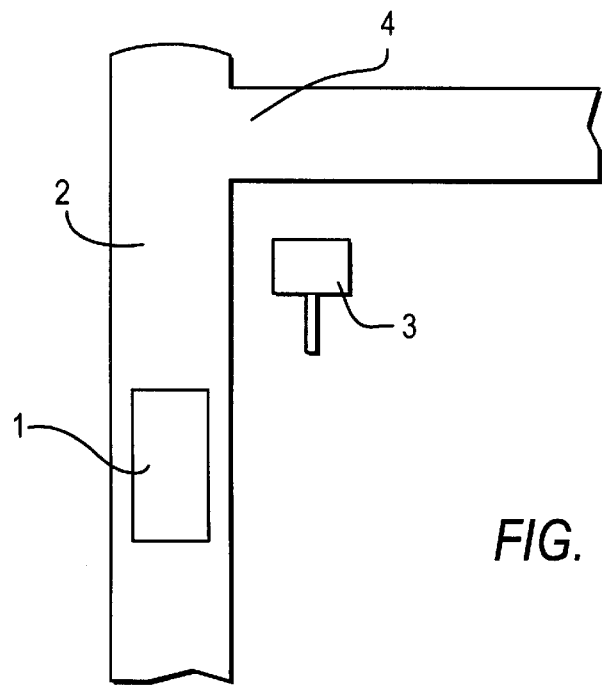
FIG. 1 is a view showing a vehicle on a street.

FIG. 1 shows a motor vehicle 1 which moves on a street 2. The navigation system is arranged in the motor vehicle 1 which presents route suggestions to a driver. Such round suggestions, serves for facilitating orientation of the driver or finding a traveling route to a desired target. For this purpose the driver introduces into the navigation system a desired target, and a navigation system supports him by route suggestions, or in other words instructions which traveling path the driver must take to the desired target.

Conventionally, a navigation system for this purpose is provided with a map storage, in which geographic informations are stored. Furthermore, conventional navigation systems have location- and position devices. An example for such a position device or location device is for example a satellite-supported GPS system, with which a location determination can be performed by aiming of satellites. Furthermore, the movement- or acceleration-oriented location or position systems are known, for example with the use of acceleration sensors, rotary speed sensors, gyroscopes or sensors which determine the movement of the wheels of the motor vehicles relative to the ground. All location- and position systems have a certain measuring error, which can accumulate during long traveling distances. When the position can not be determined accurately, it can lead to erroneous route suggestions of a navigation system. In other words the driver obtains a faulty route suggestion or the route suggestion is not provided timely. For example a command for turning can be provided when the vehicle already is driving over the turn.

Conventional navigation systems control the location and position information by comparison with the stored geographic informations and map informations of the maps storages with respect to plausibility. When based on the location- and position informations, the motor vehicle moves for a long time parallel to a street and therefore must be in a region in which no street exists, the navigation system concludes that the motor vehicle is located on the street and corrects the location- and position informations correspondingly. This process is conventionally identified as a map matching.

Furthermore, the driver of the motor vehicle can determine himself that an error of the navigation system occurs, since the driver of the motor vehicle is in the position to orient, for example on a traveling screen 3 as shown in FIG. 1. The driver can react so that he ignores the route suggestions of the navigation system, and as shown for example in FIG. 1, is oriented in correspondence with the traffic board 3 or in correspondence with other geographical informations, such as for example a cross street 4. In accordance with the present invention, an image recognition device is provided, which produces an image of the environment of the navigation system and the navigation system considers this image for production of the route suggestions.

Image informations can be used especially simply, when they are drawn for map matching. When the vehicle 1 shown in FIG. 1 passes the cross street 4, then therefore a definite point on a digital map is determinable. By the evaluation of an image of the environment of the motor vehicle 1, it is thereby recognized that the motor vehicle 1 has passed the cross street 4 and then a definite map matching can be performed. A navigation system thereby has an image production device, which produces an image of the environment of the navigation system. Such am image production device can be for example a video camera or an infrared camera or a radar antenna.

An evaluation of this image of the environment of the navigation system is performed, to recognize predetermined distinctive objects in the environment of the navigation system of the motor vehicle 1. Such distinctive objects in the environment of the navigation system can be for example traffic boards 3 or cross streets 4 or tunnels or bridges or the like. Furthermore, by evaluation of the image, also an information relative to the movement of the navigation system is provided, for example a rotary angle relative to the street, an information relative to the street of the motor vehicle and the like. All these informations are then additionally considered by the navigation system. As a rule, these considerations are performed additionally to the conventional location- and position devices or additionally to the conventional movement sensors.

Figure 2:
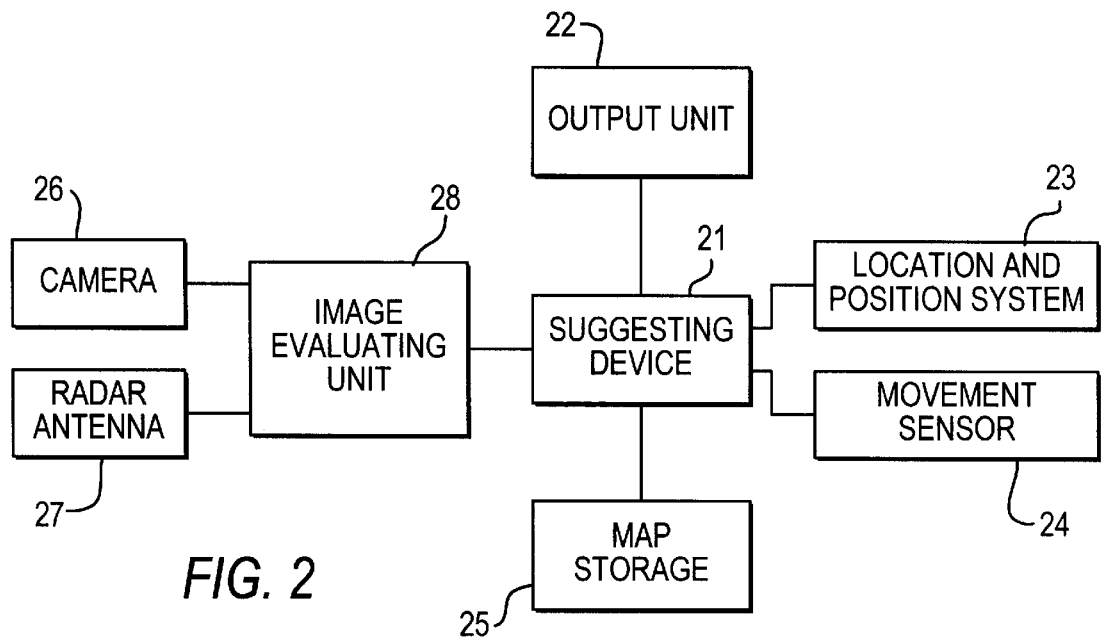
FIG. 2 is a view schematically showing an inner construction at a navigation system in accordance with the present invention.

FIG. 2 schematically shows an arrangement of an inventive navigation system. Central components of the navigation system include a suggesting device 21 which is formed as a rule as a computer. The computer has access to map information which is contained in a map storage 25. Furthermore, the computer has access to location- and position information which is made available by a location- and position system 23. Furthermore, the computer has an access to information of further sensors, such as, for example, information about the movement of the vehicle or the like. Furthermore, the computer is also supplied with information from an image evaluating unit 28, which in some cases can be a part of the computer. The image evaluating unit 28 contains information from a video or infrared camera 26 or in some cases from a radar antenna 27. When the computer or the route suggestions device 21 provides a corresponding route suggestion for the user of the navigation system, it is represented on the output unit 22.

The location- or position system 23, can be for example a GPS system and/or a gyroscope. The sensor 24 can be for example wheel sensors or sensors of an ABS systems, which supply the pulses in dependence on the rotation of a wheel. The map storage 25 can be a storage element which is suitable for storing great data quantities, for example a CDROM. Geographical informations, for example in form of a digital map are stored in the map storage 25. Furthermore, the map storage contains further geographic informations, for example distinctive points in the environment, informations about the quality of a driving path, and the like.

The camera 26 can be for example a video camera or an infrared camera which forms an image of the environment of the navigation system or of the vehicle. It can be incorporated in the navigation system. Alternatively, or additional to it, also a radar antenna 27 can be provided, which also produces an image of the environment. It is important that an environment image of the navigation system is produced, which then is evaluated. The image evaluating unit 28 is shown only schematically as a separate unit. Conventionally for image evaluation also a computer is utilized, so that with sufficient power of the computer, the image evaluating unit 28 and the route suggesting arrangement 21 can be realized in a single computer.

For the output unit 22, all devices are acceptable, which can provide information for a user of the navigation system. For example, the output unit can be formed as a display and/or a speech outputting unit.

The route suggesting device considers, for producing the route suggestions, not only the informations of the location- and position system 23 and the movement sensors 24, but also additionally the image information which is provided by the camera 26 or the radar 27.

As a result, the operation of conventional navigation systems can be improved many times.

By evaluation of the image, the traveling track can be determined. Thereby with unsafe map-matching (highway travel, acute-angled Y intersection) a correct position can be determined further. Moreover, traveling commands can be repeated and adjusted to the situation, and in some cases the route can be again calculated.

By evaluation of the image, the turning movements (of the vehicle) can be recognized and calculated, and these values can be utilized instead or in addition to the gyro information. By evaluation of the image, slow turning movements can be better recognized and determined.

With the evaluation of the image, the speed and the covered path can be determined as well, and these values can be used instead of or in addition to the known path sensors. Thereby evaluation of the image, the relative position of the vehicle to the roadway can be recognized.

By evaluation of the image, it is easier and faster to recognize when the vehicle leaves or enters the corresponding area or the route.

With evaluation of the image, it can be faster and more reliably recognized when the vehicle leaves or again resumes the route (for example a resting place).

By evaluation of the image it is possible to use paths through which there was no travel (side streets, branches) and passed objects, (bridges, tunnels, railroad lines, other POIs) for the map matching can be utilized.

By evaluation of the image, a self calibration of the navigation components can be performed, or inaccuracies/drifts of the components can be compensated.

By evaluation of the image, street boards and traffic signs can be recognized and utilized for the position determination (location entry and exit, BAB boards) and traveling commands as well as for the time of delivery of the traveling commands.

It will be understood that each of the elements described above, or two or more together, may also find a useful application in other types of constructions differing from the types described above.

While the invention has been illustrated and described as embodied in navigation system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A navigation system, comprising a map storage containing map information; a mute suggesting device which with consideration of the map information from said map storage provides route suggestions; and a device which produces an image of an environment of a navigation system, so that said mute suggesting device also considers the image of the environment of the navigation system produced by said image producing device, wherein said image producing device operates so as to recognize an image of objects in the environment of the navigation system, said route suggesting device considering the image of the objects and the environment of the navigation system, wherein said route suggesting device is formed so that it compares the recognized objects with the map information to the objects, and further comprising means for evaluating the image and performing a self calibration of navigation components or compensation of inaccuracies of the navigation components, and wherein further navigation components are provided, said further navigation components including components selected from the group consisting of movement sensors and a positioning system.

2. A navigation system as defined in claim 1, wherein said image producing device is formed so that said mute suggesting device evaluates the image and determines movement or position of the navigation system relative to the recognized objects.

3. A navigation system as defined in claim 1, wherein said route suggesting device is formed so that it takes into consideration information of further navigation components, for producing the route suggestions.

4. A navigation system as defined in claim 1, wherein said image producing device has a video camera.

5. A navigation system as defined in claim 1, wherein said image producing device has an infrared camera.

6. A navigation system as defined in claim 1, wherein said image producing device has a radar antenna.

7. A navigation system as defined in claim 1, wherein said route suggesting device is formed so that it considers the image of the image producing device at a time of an outputting of a route suggestion.

* * * * *